March 29, 1927.

F. W. DECKER 1,622,905

SPRING WHEEL

Original Filed Oct. 19, 1925   3 Sheets-Sheet 1

Frank W. Decker
INVENTOR

BY
ATTORNEY

WITNESS:

March 29, 1927.

F. W. DECKER 1,622,905

SPRING WHEEL

Original Filed Oct. 19, 1925   3 Sheets-Sheet 3

Frank W. Decker
INVENTOR

BY Victor J. Evans
ATTORNEY

WITNESS:

Patented Mar. 29, 1927.

1,622,905

UNITED STATES PATENT OFFICE.

FRANK W. DECKER, OF SANTA BARBARA, CALIFORNIA.

SPRING WHEEL.

Application filed October 19, 1925, Serial No. 63,492. Renewed December 9, 1926.

This invention relates to vehicle wheel construction and has for an object the provision of a resilient wheel which will absorb shocks and jars incident to travel over rough and uneven roads, without the use of the usual pneumatic tire.

To this end, the invention provides a wheel whose construction is such as to permit a maximum degree of yielding relative movement between the hub and rim, in such manner as to compensate for slight jars as well as heavy jars or bumps, means being provided to prevent injury to the wheel when the latter is subjected to rough usage under heavy loads.

With the above and other objects in view, the invention further includes the following novel features and details of construction, to be hereinafter more fully described, illustrated in the accompanying drawings and pointed out in the appended claims.

In the drawings:—

Figure 1:
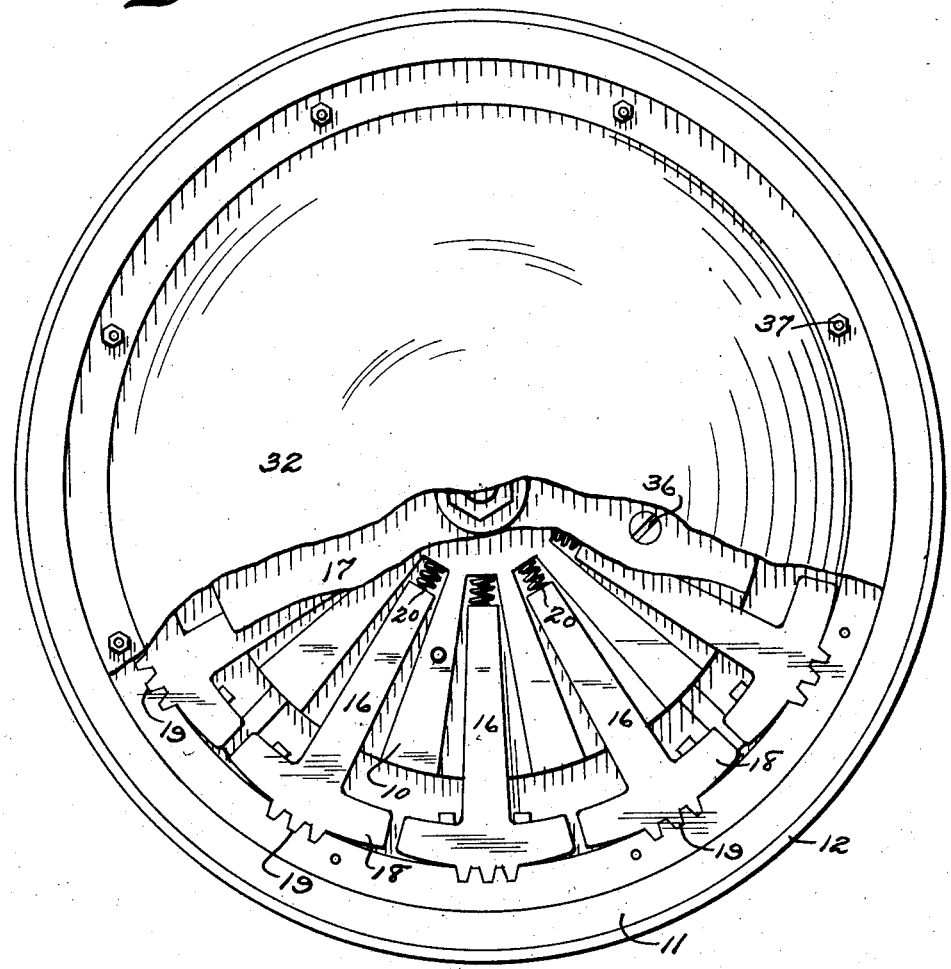
Figure 1 is a side elevation partly broken away showing a wheel constructed in accordance with the invention.
Figure 2:
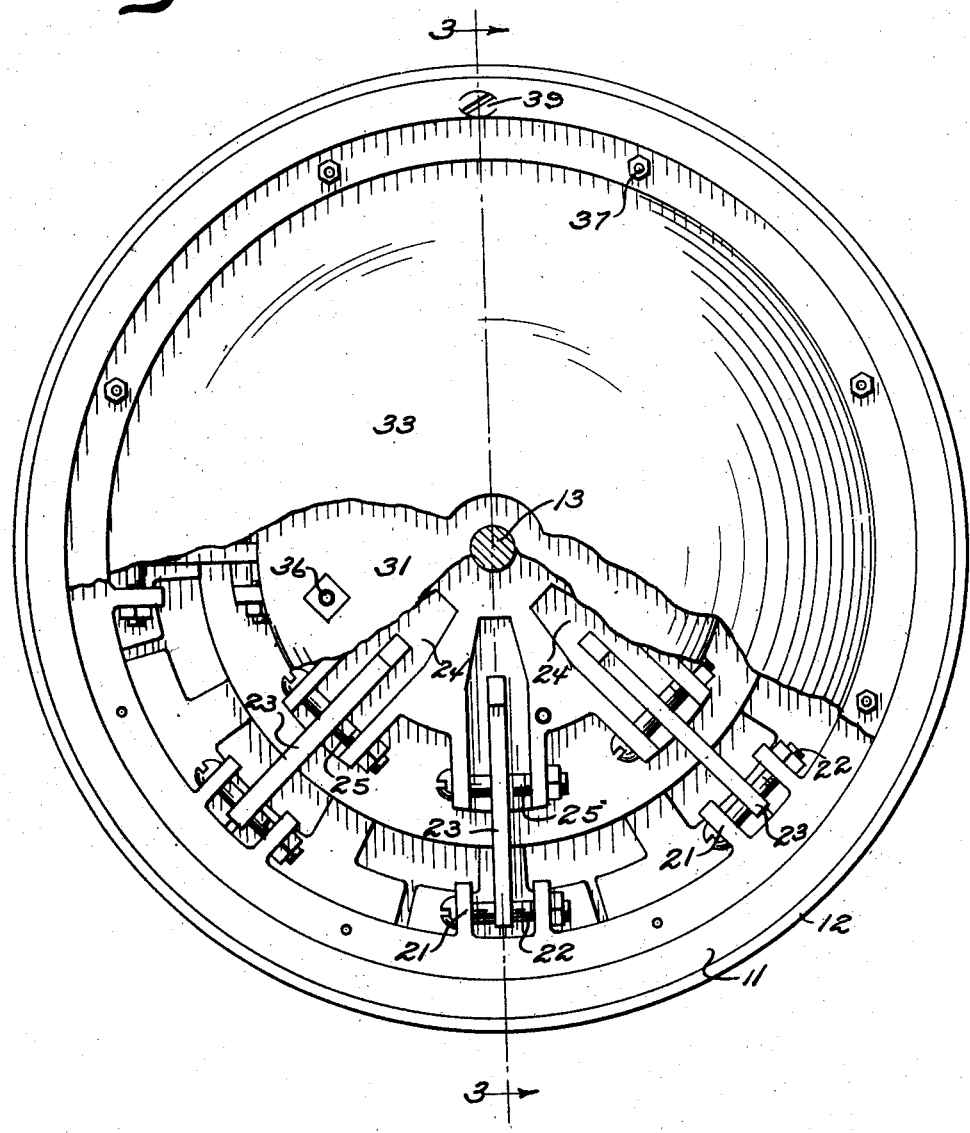
Figure 2 is a similar view looking at the opposite side of the wheel from that shown in Figure 1.
Figure 3:
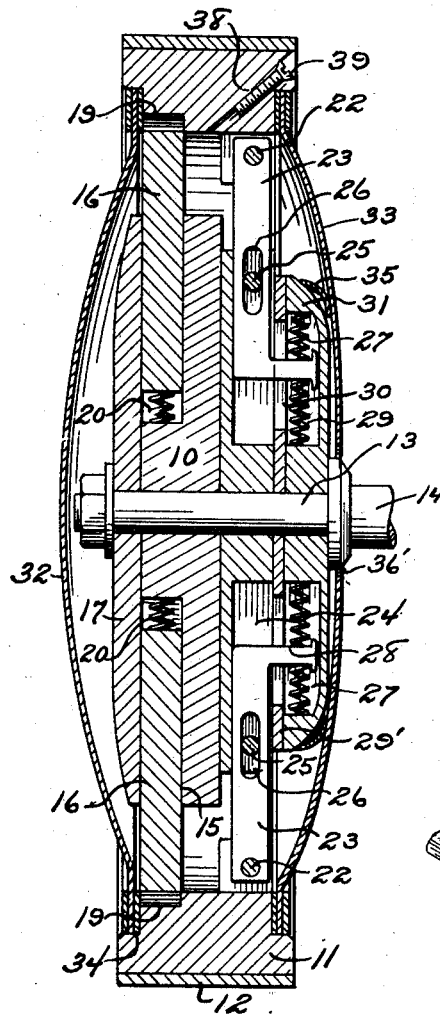
Figure 3 is a section on the line 3—3 of Figure 2.
Figure 4:
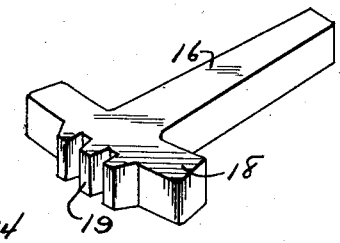
Figure 4 is a detail perspective view of one of the spokes.
Figure 5:
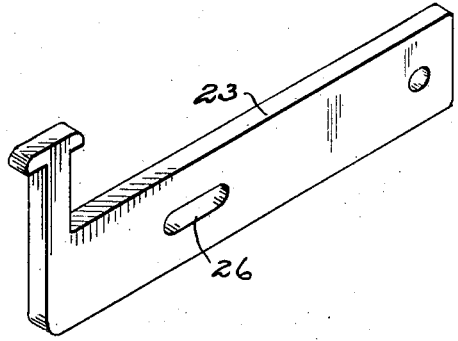
Figure 5 is a similar view of one of the controlling levers.

Referring to the drawings in detail wherein like characters of reference denote corresponding parts, the reference character 10 indicates the hub of the wheel and 11 the felly, the latter being spaced around the hub and provided with a tire 12 of any desired character. The hub 10 is provided with an opening for the passage of the spindle 13 of an axle 14.

The hub of the wheel is provided adjacent one face with radially disposed pockets 15, the latter accommodating spokes 16 which are slidable radially within the pockets and are capable of limited movement circumferentially of the hub. The outer walls of the pockets are formed by a plate 17 which plate forms a part of the hub structure.

The outer ends of the spokes 16 carry heads 18 of arcuate shape, the curvature of these heads being upon an arc different from that of the inner edge of the felly 11, so that the spokes are permitted independent rocking movement upon the felly. Teeth 19 provide an interlocking engagement between the felly and spokes in a manner to permit of free rocking movement of the latter, yet hold the spokes and felly properly associated. The spokes 16 are yieldingly forced outward by means of springs 20 arranged at the inner ends of the pockets and bearing against the inner ends of the spokes.

Pivotally secured between spaced ears 21 carried by the felly 11 and as indicated at 22, are the outer ends of controlling levers 23. The inner ends of these levers are movable within radially disposed pockets 24 provided in the hub 10. Stop pins 25 which extend across the pockets 24, pass through slots 26 provided in the levers 23 so as to permit these levers to move longitudinally within the pockets. The pockets 24 are of greater width than the width of the levers 23 so that the latter may have limited lateral movement.

The pockets 24 are provided at their inner ends with extended recesses 27 and the levers 23 are provided with right angled extensions 28 which are disposed within these recesses. Springs 29, secured in any suitable manner, located within the recesses 27 bear against opposite sides of the extensions 28 and act to yieldingly resist movement of the hub upon the levers 23. A cover plate 29' forms the outer wall of the pockets 24 and this plate is provided with radially disposed slots 30 for the passage of the extensions 28. The recesses 27 are formed in a disk 31 which bears against the plate 29' and the relative lengths of the recesses 27 and the slots 30 are such that the plates act to retain the springs 29 within the recesses.

The felly 11 has secured thereto an outer disk 32 and an inner disk 33. These disks enclose the hub and movable parts of the wheel and provide a lubricant chamber. The outer edges of the disks are provided with gaskets 34 to prevent leakage of grease, while the inner disk 33 is provided with an annular baffle flange 35 which prevents the grease from reaching the opening 36' through which the spindle 13 passes.

The hub may be formed of a single piece of material, but it is preferred to form the hub in the manner illustrated for convenience of manufacture, the sections which compose the hub being connected by bolts 36 passing therethrough and through the disk 31 and plate 29'. The disks 32 and 33 are removably secured by means of bolts 37.

The wheel is packed with grease at long intervals, the disks 32 and 33 being removed for that purpose. Between these intervals, oil is introduced through an oil passage 38 which is normally closed by a screw or plug 39.

The invention is susceptible of various changes in its form, proportions and minor details of construction and the right is herein reserved to make such changes as properly fall within the scope of the appended claims.

Having described the invention what is claimed is:—

1. A wheel comprising a hub, a rim surrounding and spaced from the hub, spokes having their inner ends guided in the hub, springs to yieldingly force the spokes outwardly, means operatively associating the outer ends of the spokes and rim, levers having their outer ends pivotally connected to the rim and oppositely disposed compression springs operatively associating the inner ends of the levers and hub and disks carried by the rim and enclosing the hub.

2. A wheel comprising a hub, a rim surrounding and spaced from the hub, spokes having their inner ends guided in the hub, springs to yieldingly force the spokes outwardly, arcuate heads at the outer ends of the spokes, teeth operatively associating the spoke heads and rim to permit of independent rocking movement of the spokes, levers having their outer ends pivotally connected to the rim, oppositely disposed compression springs operatively associating the inner ends of the levers and hub, and disks carried by the rim and enclosing the hub.

3. A wheel comprising a hub, a rim surrounding and spaced from the hub, spokes having their inner ends guided in the hub, springs to yieldingly force the spokes outward, means operatively associating the outer ends of the spokes and rim, levers having their outer ends pivotally connected to the rim, means to guide the levers in the hub, right angled extensions at the inner ends of the levers, springs upon opposite sides of said extensions to yieldingly connect the inner ends of the levers and hub and disks carried by the rim and enclosing the hub.

4. A wheel comprising a hub having radially disposed pockets therein, spokes having their inner ends disposed within the pockets, springs at the inner ends of the pockets to engage the spokes and force the latter outward, a rim surrounding and spaced from the hub, means associating the outer ends of the spokes and rim to permit of independent rocking movement of the spokes, other pockets disposed radially within the hub and spaced transversely from the spoke pockets, levers within said other pockets, means pivotally connecting the outer ends of the levers with the rim, oppositely disposed compression springs operatively associating the inner ends of the levers and hub and disks carried by the rim and enclosing the hub.

5. A wheel comprising a hub having radially disposed pockets therein, spokes having their inner ends disposed within the pockets, springs at the inner ends of the pockets to engage the spokes and force the latter outward, a rim surrounding and spaced from the hub, means associating the outer ends of the spokes and rim to permit of independent rocking movement of the spokes, other pockets disposed radially within the hub and spaced transversely from the spoke pockets, levers within said other pockets, means pivotally connecting the outer ends of the levers with the rim, said other pockets having offset portions at their inner ends, right angled extensions carried by the inner ends of the levers and disposed within said offset portions, springs within the offset portions of the pockets upon opposite sides of the right angled extensions to yieldingly connect the levers and hub and disks carried by the rim and enclosing the hub.

In testimony whereof I affix my signature.

FRANK W. DECKER.